No. 883,889. PATENTED APR. 7, 1908.
W. KIESER.
TURBINE BUCKET.
APPLICATION FILED OCT. 10, 1906.
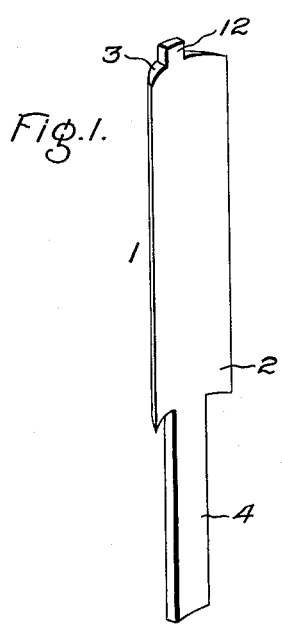
Fig. 1. Fig. 2.
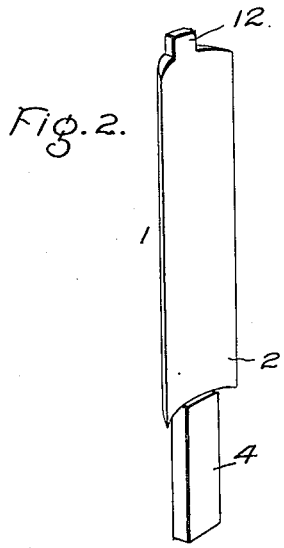
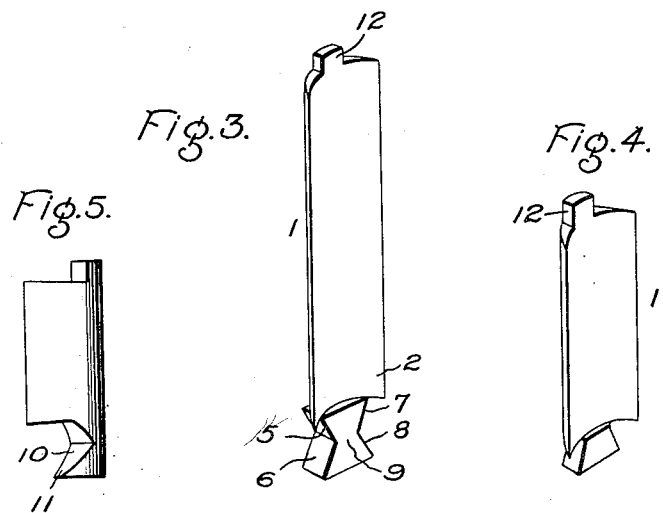
Fig. 5. Fig. 3. Fig. 4.
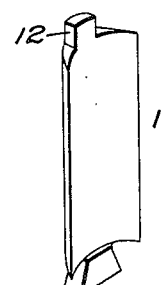
Witnesses:
Marcus L. Byng.
Alex. F. Macdonald.
Inventor:
Walter Kieser,
by Alfred Davis
Att'y.

UNITED STATES PATENT OFFICE.

WALTER KIESER, OF BERLIN, GERMANY, ASSIGNOR TO GENERAL ELECTRIC COMPANY, A CORPORATION OF NEW YORK.

TURBINE-BUCKET.

No. 883,889. Specification of Letters Patent. Patented April 7, 1908.

Application filed October 10, 1906. Serial No. 338,207.

*To all whom it may concern:*

Be it known that I, WALTER KIESER, a citizen of Switzerland, residing at Berlin, Germany, have invented certain new and useful Improvements in Turbine-Buckets, of which the following is a specification.

In the construction of elastic - fluid turbines it is sometimes necessary in order to obtain the highest economy of steam or other fluid consumption to use buckets of relatively thin cross-section and to rotate them at high speeds thereby subjecting them to very high centrifugal strains. In those cases where the buckets are of necessity made of considerable length as well as thin in cross-section to accommodate considerable volumes of motive fluid the difficulties of construction are greatly increased. It is preferable in many cases and necessary in others to use independent buckets and to secure each bucket to its support by individual means, such for example as a dovetail, T- or similarly shaped base, which is inserted in a properly formed slot or recess in the support. If the bucket is thin the formation of the base will so reduce the stock therein that the base is no longer capable of withstanding the tremendous centrifugal strains to which it is subjected.

My invention therefore has for its object to provide a bucket of the necessary cross-section, shape and length, with a base that is strong enough to resist all centrifugal strains to which it may be subjected, prevent the bucket from twisting out of its normal position, and preserve the alinement of the buckets in the wheel or other support.

In carrying out the invention the buckets may be made in a variety of ways, but I prefer to cut them to the proper length from bars or strips made to conform to the proper shape, size, thickness, etc. by being passed through rolls and dies while cold, since this will give the surfaces of the buckets the necessary finish and at the same time make the metal homogeneous. On one end of the bucket is then formed a shank of considerable length made by cutting away the sharpened edges. This shank has a suitable width and is of a thickness corresponding to that of the main body of the bucket in the plane of the cut. The amount of metal in the shank should be sufficient to permit of the formation of a base of suitable size. As before pointed out, if a shank of this kind is then cut to form a dovetail base, it will not be strong enough to withstand the centrifugal strains when the turbine is in operation. In order to overcome this objection, I place the bucket with its partly formed base in a suitable press operated hydraulically for example, and heat the shank to a point where it can be suitably shaped by a subsequent die operation. I have found that the shank can be brought to the desired temperature by an electrically heated agency, but my invention is not limited thereto since other heating agencies can be employed.

My experience is that it is satisfactory to use a portable hand tool comprising an electrode which is placed in contact with the shank to be heated, the bucket itself being connected to the opposite side of the circuit, and a suitable current of electricity permitted to pass through the electrode and bucket. While the shank is thus heated to the proper degree, it is forced into a die which decreases its length and at the same time increases its thickness. For relatively thick buckets one heating and one die operation is usually sufficient, but where the buckets are especially thin, it is necessary to make the original shank of considerable length and it usually becomes necessary to use two or more heating and die operations, one heating usually not being sufficient, because the metal will not hold the heat. After the shank is thus formed, it may be milled, punched, or otherwise treated on the sides to form a dove-tail, T- or other shape adapted to engage a suitable slot or recess in a support and secure the bucket. Where a cover is to be used on the free end of the bucket a tenon may be provided which, when the parts are assembled, passes through the cover and is riveted over.

In the accompanying drawing is shown one of the embodiments of my invention, wherein Figure 1 is a perspective view of a bucket showing the shank in its original form; Fig. 2 is a perspective view of the same bucket showing the shank after one heating and die operation; Fig. 3 shows the same bucket after it is finished; Fig. 4 shows a slightly different form of dovetail base; and Fig. 5 shows on a somewhat enlarged scale a dovetail base formed in the old way.

1 represents a bucket having a concave wall 2 and a convex wall 3, the side edges being made sharp so as not to oppose the passage of steam or other motive fluid. At the bottom is formed a shank 4 of such length and width that it will, when heated and upset, make a base of sufficient size to withstand the strains to which the bucket is subjected.

In Fig. 2 the bucket shank has been heated and upset once, thus making it shorter and thicker than it was originally.

In Fig. 3 the bucket is shown as finished. This figure is representative of a bucket having a shank of the kind shown in Figs. 1 and 2, and finished by two heating and upsetting operations, and also of a bucket having a shank formed by one heating and upsetting operation. After the shank is properly made the sides are or may be cut away by milling or otherwise, as at 5, 6, 7, 8 to form a dovetail or other convenient means for securing the bucket. In this connection it is to be noted that the thickness of the metal at 9, the point of minimum section, is much greater than that of the bucket proper. In other words, the section of metal at 9 which was formerly the weakest part of the bucket and liable to rupture is now of a strength amply sufficient to withstand all strains to which the bucket is subjected.

My invention is applicable to the stationary intermediate buckets as well, but is not of such great importance in that connection since the buckets are not subjected to such strains.

By making the surfaces 5, 6 and 7, 8 of sufficient width the bucket will be rigidly held in its support and prevented from twisting and getting out of alinement. The bases may be of such a thickness that they form the spacers or distance pieces between buckets when assembled, or separate spacers may be employed.

In Fig. 5 I have shown on an enlarged scale an old form of bucket having a dovetail base made without upsetting the shank. The bucket, broadly stated, is crescent-shaped and the cutting of a dovetail in the base greatly reduces the cross-section of the stock. The front and rear walls of the bucket being curved, a beveled cut extending at right angles to the plane thereof results in a lower face 10 of triangular shape. Obviously the section of the metal at 11 is so much reduced as to possess comparatively little strength. On the contrary, the base of my improved bucket is provided with generous bearing surfaces, the latter being approximately twice as large for a given bucket as those shown in Fig. 5. To state the matter in other words, in the old construction the surfaces of the dovetail, when viewed in elevation, formed triangles, while with my new construction they form rectangles of approximately twice the area.

The outer or free ends of the buckets are provided with tenons 12 which are adapted to pass through correspondingly shaped openings in the bucket cover and when riveted over to secure said cover in place.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A turbine bucket of suitable cross-section having an upset base formed integral therewith, the shank at the point of minimum cross-section being thicker than the body of the bucket.

2. A turbine bucket cut from a suitably formed strip or bar of stock having the desired shape in cross-section, with an integral upset base therefor, the said base being provided with surfaces adapted to engage the bucket support and being thicker at the point of minimum cross-section than the body of the bucket.

3. A turbine bucket comprising a crescent-shaped strip or bar of stock with an upset base therefor, the said base forming a dovetail, the surfaces of which form rectangles.

In witness whereof, I have hereunto set my hand this fifth day of October, 1906.

WALTER KIESER.

Witnesses:
 BENJAMIN B. HULL,
 HELEN ORFORD.